US007979458B2

(12) United States Patent
Zeller et al.

(10) Patent No.: US 7,979,458 B2
(45) Date of Patent: Jul. 12, 2011

(54) ASSOCIATING SECURITY TRIMMERS WITH DOCUMENTS IN AN ENTERPRISE SEARCH SYSTEM

(75) Inventors: Mark Jeremy Zeller, Bellevue, WA (US); Arshish Cyrus Kapadia, Issaquah, WA (US); Shajan Dasan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/653,518

(22) Filed: Jan. 16, 2007

(65) Prior Publication Data

US 2008/0172390 A1    Jul. 17, 2008

(51) Int. Cl.
*G06F 17/30* (2006.01)
*G06F 7/00* (2006.01)
(52) U.S. Cl. ......... 707/769; 707/694; 707/770; 707/781
(58) Field of Classification Search .................. None
See application file for complete search history.

(56) References Cited

U.S. PATENT DOCUMENTS

| | | | |
|---|---|---|---|
| 6,094,649 A | 7/2000 | Bowen et al. | |
| 6,134,549 A | 10/2000 | Regnier et al. | |
| 6,144,973 A | 11/2000 | Fujii et al. | |
| 6,189,103 B1 * | 2/2001 | Nevarez et al. | 726/5 |
| 6,269,380 B1 * | 7/2001 | Terry et al. | 707/200 |
| 6,357,010 B1 * | 3/2002 | Viets et al. | 726/4 |
| 6,381,602 B1 | 4/2002 | Shoroff et al. | |
| 6,460,141 B1 * | 10/2002 | Olden | 726/4 |
| 6,944,613 B2 | 9/2005 | Lef et al. | |
| 7,076,493 B2 | 7/2006 | Myers et al. | |
| 7,107,285 B2 * | 9/2006 | von Kaenel et al. | 707/104.1 |
| 2003/0135582 A1 | 7/2003 | Allen et al. | |
| 2004/0153509 A1 * | 8/2004 | Alcorn et al. | 709/205 |
| 2004/0158527 A1 | 8/2004 | Lambert | |
| 2004/0162816 A1 | 8/2004 | Irle et al. | |
| 2005/0039033 A1 * | 2/2005 | Meyers et al. | 713/193 |
| 2005/0060286 A1 | 3/2005 | Hansen et al. | |
| 2005/0071766 A1 * | 3/2005 | Brill et al. | 715/738 |

(Continued)

FOREIGN PATENT DOCUMENTS

EP    1058182 A    12/2000

OTHER PUBLICATIONS

International Search Report, PCT/US2008/051164. Dated May 15, 2008. 11 Pages.

(Continued)

*Primary Examiner* — Greta L Robinson
*Assistant Examiner* — James J Wilcox
(74) *Attorney, Agent, or Firm* — Hope Baldauff Hartman, LLC

(57) ABSTRACT

Methods and computer-readable media are provided for associating security trimmers with documents in an enterprise search system. According to one method, a search index is maintained that includes one or more document identifiers corresponding to documents stored at back-end computing systems. Each document identifier in the search index is associated with one or more security trimmer implementations. When a query request is received from a user, the search index is queried to identify documents referenced by the search index that match search terms provided with the query request. For each document that matches the search terms, the associated security trimmer implementations are identified and executed to retrieve the access rights to view the document for the current user from the back-end computing system where the document is stored.

8 Claims, 8 Drawing Sheets

U.S. PATENT DOCUMENTS

| | | | |
|---|---|---|---|
| 2005/0086206 A1* | 4/2005 | Balasubramanian et al. | 707/3 |
| 2005/0192936 A1* | 9/2005 | Meek et al. | 707/3 |
| 2005/0216845 A1 | 9/2005 | Wiener | |
| 2006/0036748 A1 | 2/2006 | Nusbaum et al. | |
| 2006/0167860 A1* | 7/2006 | Eliashberg et al. | 707/3 |
| 2008/0091448 A1* | 4/2008 | Niheu et al. | 705/1 |

OTHER PUBLICATIONS

Damiani, et al., "A fine-grained access control system for XML documents", Date: May 2002. p. 169-202, vol. 5, Issue: 2, ACM Press, NY, USA, http://delivery.acm._org/10.1145/510000/505590/p169-damiani.pdf?key1=505590&key2=8529951611&coll=GUIDE&dl=portal, ACM&CFID=11111111&CFTOKEN=2222222.

Fink, et al., "Specification and Enforcement of Access Control in Heterogeneous Distributed Applications", Date: 2003, pp. 88-100, http://citeseer.ist.psu.edu/cache/papers/cs/31332/http:zSzzSzwww.netobjectdays.orgzSznode03zSzdezSzConfzSzpublishzSz..zSz..zSz..zSz..zSzpdfzSz03zSzpaperszSzicwszSz28530088.pdf/specification-and-enforcement-of.pdf.

Petinot, et al., "Enabling interoperability for autonomous digital libraries : an API to citeseer services", Date: 2004, pp. 372-373, ACM Press, NY, USA, http://delivery.acm.org/10.1145/1000000/996437/p372-petinot.pdf?key1=996437&key2=8249951611&coll=ACM&dl=ACM&CFID=2864154&CFTOKEN=76091584.

Chinese Official Action dated Mar. 24, 2011 in Chinese Application No. 200880002159.X.

* cited by examiner

ASSOCIATING SECURITY TRIMMERS WITH DOCUMENTS IN AN ENTERPRISE SEARCH SYSTEM

BACKGROUND

Enterprise search systems allow content stored within an organization to be indexed, searched, and displayed to authorized users within the organization. In order to provide this functionality, enterprise search engines typically must index and query against structured and unstructured data and documents stored by multiple, independent, third-party enterprise software applications and systems. For instance, in many cases an enterprise search system must index and query against data stored in intranets, document and content management systems, file servers, corporate desktops, business applications such as customer relationship management and business intelligence applications, and other types of content stores.

In contrast to public search engines that search publicly available data and allow virtually any user to execute queries on the data, such as World Wide Web ("Web") search engines, enterprise search systems generally index data for which access may be limited. For instance, a document indexed by an enterprise search system may have an associated access control list ("ACL") that includes one or more access control entries ("ACEs") that identify the access rights a user has to the document. As a result, when an enterprise search system executes a query, it must ensure that the user executing the query has sufficient access rights to view each of the search results returned in response to the query.

In order to determine whether a user has sufficient access rights to view search results, an enterprise search system may retrieve and store the access rights for each document at the time the document is added to the search index. At query time, the enterprise search system can utilize the previously stored access rights to determine if the user executing the query has sufficient rights to view the search results. Storage of access rights for all of the documents referenced by a search index, however, can be cumbersome and expensive to perform and maintain.

Alternatively, an enterprise search system may query the back-end system at which each document in a set of search results is stored for access rights to the documents for the user at the time the query is performed. In this type of implementation, the back-end system provides the document at crawl time and the access rights for the document at query time. Often, however, the security sub-systems of each back-end computer system utilize application programming interfaces ("APIs") that are disparate, arcane, and possibly proprietary. As a result, it is generally necessary for custom program code, called security trimmers, to be utilized in order to invoke the different APIs provided by various back-end systems for obtaining the access rights. It can be difficult, however, for an enterprise search system to determine the security trimmer that should be utilized with respect to each document present in a set of search results.

It is with respect to these considerations and others that the disclosure made herein is provided.

SUMMARY

Methods and computer-readable media are provided herein for associating security trimmers with documents in an enterprise search system. Through the implementations described herein, security trimmers can be easily associated with documents identified in a search index. At query time, the appropriate security trimmers can be identified and utilized to obtain the access rights for each document in a set of search results.

According to one aspect presented herein, a method is provided for associating security trimmers with documents in an enterprise search system. According to one method, a search index is maintained that includes one or more document identifiers corresponding to documents stored at back-end computing systems. The document identifiers, for instance, may be uniform resource locators ("URLs") for the documents stored at the back-end computing systems.

Each document identifier in the search index is associated with one or more security trimmers. A security trimmer is program code capable of invoking an API on a back-end system for determining whether a user has access rights to view a document. When a query request is received from a user, the search index is queried to identify documents referenced by the search index that match search terms provided with the query request. For each document that matches the search terms, the associated security trimmers are identified and executed to retrieve the access rights to view the document for the current user. The identified security trimmers may be executed simultaneously.

When the access rights to view each document are received, a determination is made as to whether the current user has sufficient access rights to view each document. If the user has the appropriate access rights to view a document, the document is displayed to the user in the search results. In one implementation, a security trimmer resolver program performs the tasks of selecting the appropriate trimmer implementations for each document, executing the security trimmer implementations, and combining the results received from the trimmer implementations to determine whether the document should be shown in the search results.

In one implementation, each document identifier is associated with one or more crawl rules. A crawl rule is a regular expression on a document URL. Therefore, defining a crawl rule results in defining a subset of documents in a subset of back-end computing systems. Each crawl rule is associated with one or more security trimmer implementations. In this manner, document identifiers are associated with crawl rules, which are in turn associated with one or more trimmer implementations. Each crawl rule may also be associated with a particular security trimmer resolver.

According to other implementations, each crawl rule has an associated priority value. The priority value is utilized to select the appropriate crawl rule when more than one crawl rule corresponds to a document. Additionally, in other embodiments, opaque security data may be retrieved from the back-end computing system at which a document is stored at crawl time and persisted in the search index. At query time, the security data may be provided to a security trimmer implementation and transmitted to the back-end system with the request for access rights to the document. The security data may then be utilized by the back-end system to determine the access rights to the document.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods, and computer-readable media for associating security trimmers with documents identified in a search index of an enterprise search system. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network ("LAN") or wide area network ("WAN").

Figure 1:
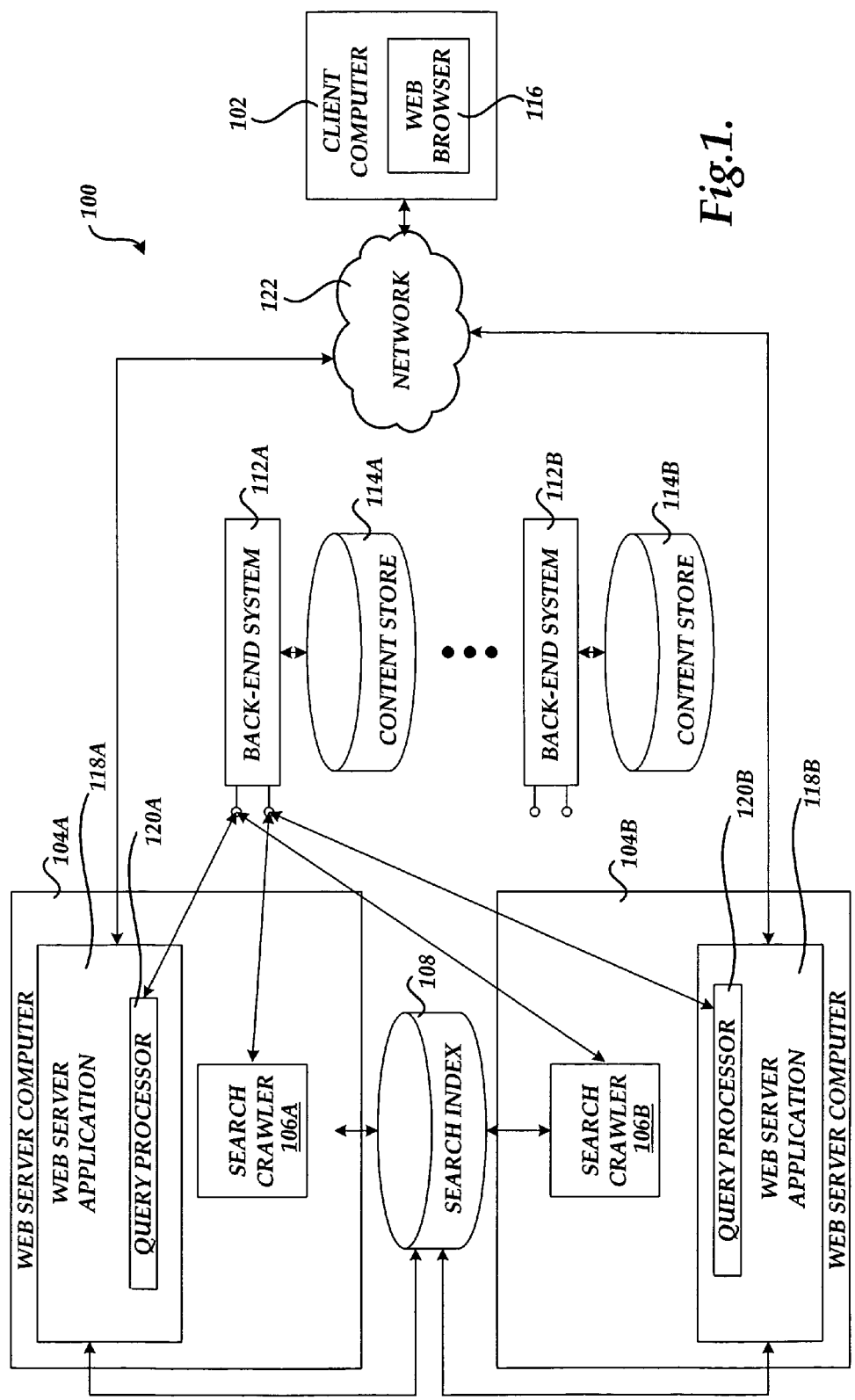
FIG. 1 is a network and software diagram showing an illustrative operating environment for the processes and computer systems described herein, and several of the software components utilized by the computer systems described herein.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for associating security trimmers with documents will be described. In particular, FIG. 1 is a computer software architecture and network diagram illustrating one operating environment 100 for the subject matter described herein that includes a client computer 102, a network 122, and one or more Web server computers 104A-104B. It should be appreciated that although only two Web server computers 104A-104B, two back-end systems 112A-112B, and one client computer 102 have been illustrated in FIG. 1, any number of these computing devices may be present and utilized in the manner described herein.

As shown in FIG. 1, the client computer 102 and the Web server computers 104A-104B are communicatively coupled to one another through respective connections to the network 122. According to one implementation, the network 122 comprises the Internet. However, it should be appreciated that the network 122 may comprise a LAN, WAN, or other type of network suitable for connecting the client computer 102 and the Web server computers 104A-104B. The Web server computers 104A-104B are also coupled to one or more back-end systems 112A-112B. The back-end systems 112A-112B are computing systems capable of storing documents in a respective content store 114A-114B. As used herein, the term document means any indexable unit of data. Additional details regarding the operation of the back-end systems 112A-112B are provided below.

FIG. 1 also illustrates a number of software components utilized by the client computer 102 and the Web server computers 104A-104B. In particular, the Web server computers 104A-104B are operative to execute the search crawlers 106A-106B, respectively. The search crawlers 106A-106B are application programs designed to gather documents from a variety of sources, such as documents stored in the content stores 114A-114B of the back-end systems 112A-112B. The back-end systems 112A-112B may comprise any type of computing system utilized to store content, such as an intranet server, a document or content management system, a file server, a corporate desktop, a business application such as a customer relationship management application or a business intelligence application, or another type of content store.

In order to perform the document identification and indexing process, the search crawlers 106A-106B are seeded with information about content stores. The search crawlers 106A-106B then retrieve documents from the content stores, index the documents, and store the indexed content and any associated metadata in a database called the search index 108. The search crawlers 106A-106B may also identify links to other documents contained in each document and follow the links to obtain and index additional documents. This process is referred to as "crawling."

During the crawl process, the search crawlers 106A-106B may also obtain security data for the documents that are indexed. For instance, in one implementation, the access rights for each document that is indexed are retrieved and stored in the search index 108. For instance, the search crawlers 106A-106B may obtain a list of authorized users for each document. Because the security data is typically meaningless to the Web server computers 104A-104B, the security data may be referred to herein as being opaque.

According to one implementation, the client computer 102 includes a Web browser program (referred to herein as a "browser") 116. The browser 116 is operative to request, receive, and display information pages, such as Web pages, from the server computers 104A-104B. In particular, the browser 116 is operative to establish a connection with one of the Web server applications 118A-118B executing on the server computes 104A-104B. Through the connection, the browser 116 may request a Web page for executing a query of the search index 108. Such a query request is processed by a query processor 120A-120B executing on the Web server computer 104A-104B that fields the query request.

The query processors 120A-120B respond to user queries by identifying the documents in the search index 108 that contain the keywords in the user query. The query processors 120A-120B also evaluate whether or not each document should be returned as a search result based upon whether the user performing the query has sufficient access rights to view each document. As will be described in greater detail below, each query processor 120A-120B may dynamically query the appropriate back-end system 112A-112B for access rights indicating whether the user executing the query has the appropriate access rights to view each document in the search results.

In one implementation, the queries to the security APIs exposed by the back-end systems 112A-112B are invoked through the use of security trimmers and a security resolver. As will be described in greater detail below with reference to FIGS. 2-6B, each document identifier in the search index 108 may be associated with one or more security trimmer implementations responsible for invoking an API on a back-end system for determining whether a user has access rights to view the corresponding document.

Figure 2:
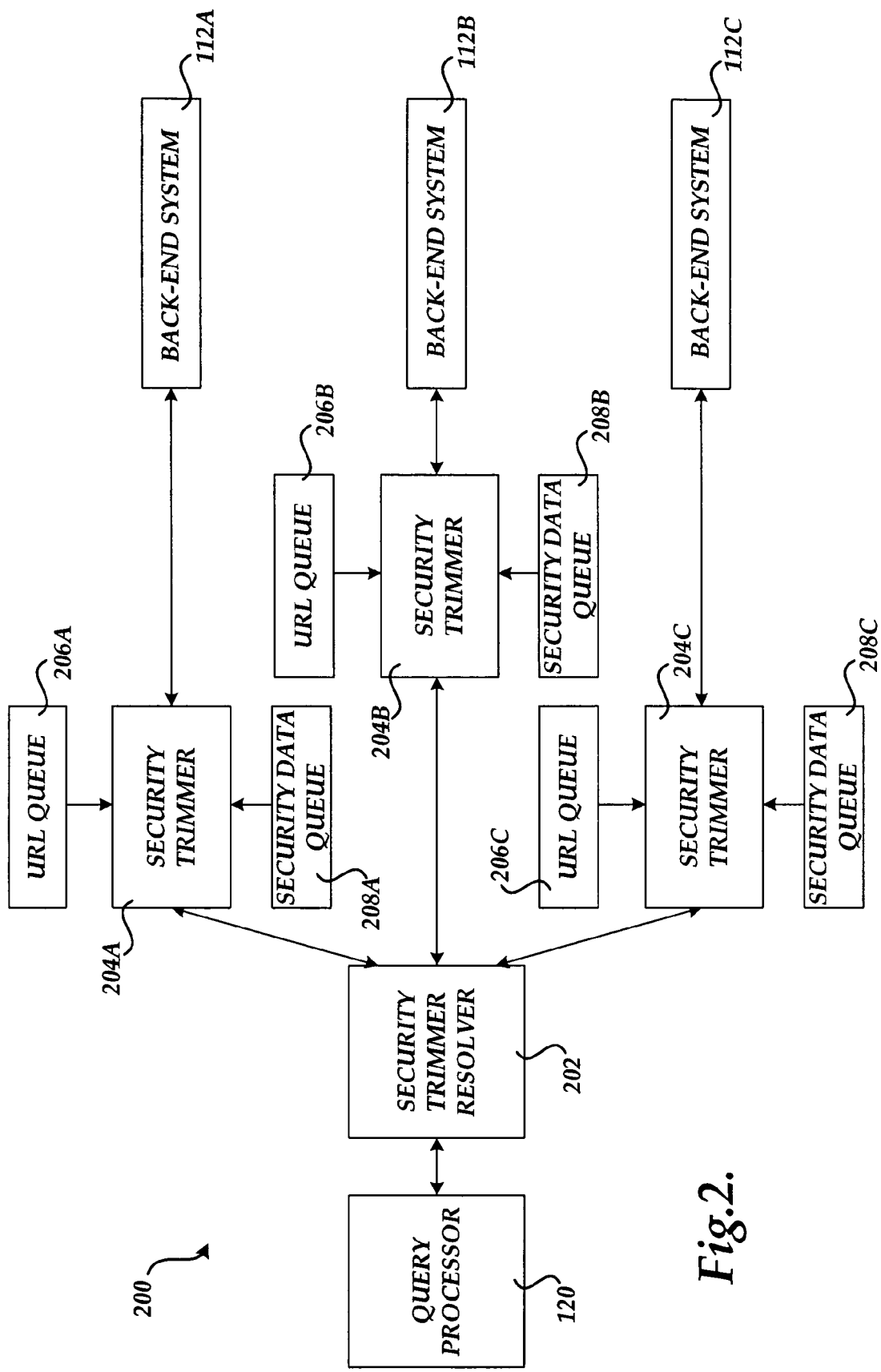
FIG. 2 is software architecture diagram illustrating aspects of a security trimmer resolver and security trimmers described herein in one implementation.

Referring now to FIG. 2, additional details regarding a software architecture including a security trimmer resolver and security trimmers provided herein will be described. As discussed briefly above, a query processor 120 may utilize a security trimmer resolver 202 and one or more security trimmers 204A-204C to communicate with the security APIs exposed by the back-end systems 112A-112C at which index documents are stored. Each security trimmer resolver 202 is program that is operative to select which of the security trimmers 204A-204C to invoke to obtain the access rights for a particular document. The security trimmer resolver 202 is also operative to receive the access rights from each of the security trimmers 204A-204C and to make a decision based on the rights as to whether a current user is authorized to view a document. According to implementations, this determination may be made by conjunctively chaining the results of all matching trimmers. Alternatively, this determination may be made by disjunctively selecting a security trimmer based on a performance heuristic or a combination of the two. The security trimmer resolver 202 passes the results of the decision to the query processor 120 for use in generating the search results that are actually provided to the user.

As also discussed briefly above, the security trimmers 204A-204C are programs that are operative to invoke an API exposed by a back-end system 112A-112C that determines whether or not to display a document in a set of search results. The security trimmers 204A-204C are programmed to interoperate with a particular type of back-end system. For instance, the security trimmer 204A may be configured to operate with an API exposed by the back-end system 112A while the security trimmer 204A is configured to operate with an API exposed by the back-end system 112B. The security trimmers 204A-204C handle all aspects of communication with the back-end systems 112A-112C, including authentication, communication of an end-user security context, and the translation of a document URL into a document identifier native to the particular back-end system 112A-112C.

In one implementation, each of the security trimmers 204A-204C includes an associated URL queue 206A-206C, respectively. Each URL queue 206A-206C may be utilized by the security trimmer resolver 202 to queue up a multitude of document identifiers for which access rights should be retrieved. When all of the document identifiers for documents in a set of search results have been queued, the security trimmer resolver 202 may cause the security trimmers 204A-204C to be executed simultaneously. Depending upon the configuration of the security trimmer resolver 202, a result may be provided to the query processor 120 for a document as soon as the first of the back-end systems 112A-112C responds with the requested access rights.

According to another implementation, each security trimmer 204A-204C may also include a security data queue 208A-208C, respectively. In this implementation, security data may be retrieved from the back-end systems 112A-112C at crawl time and persisted in the search index 108 for each document. At query time, the security data is retrieved and placed into the appropriate security data queue 208A-208C. When a security trimmer 204A is executed on a URL, the security trimmer 204A transmits the security data in the associated security data queue 208A to the back-end system 112A with the request for access rights to a document. The security data may then be utilized by the back-end system 112A to determine the access rights to the document.

As will be described in greater detail below, any document referenced in the search index 108 may be associated with one or more security trimmers 204A-204C to determine whether or not to display the document in response to search query submitted by a user. FIGS. 3-5B illustrate an exemplary mechanism for associating documents referenced in the search index 108 with the security trimmers 204A-204C.

Figure 3:
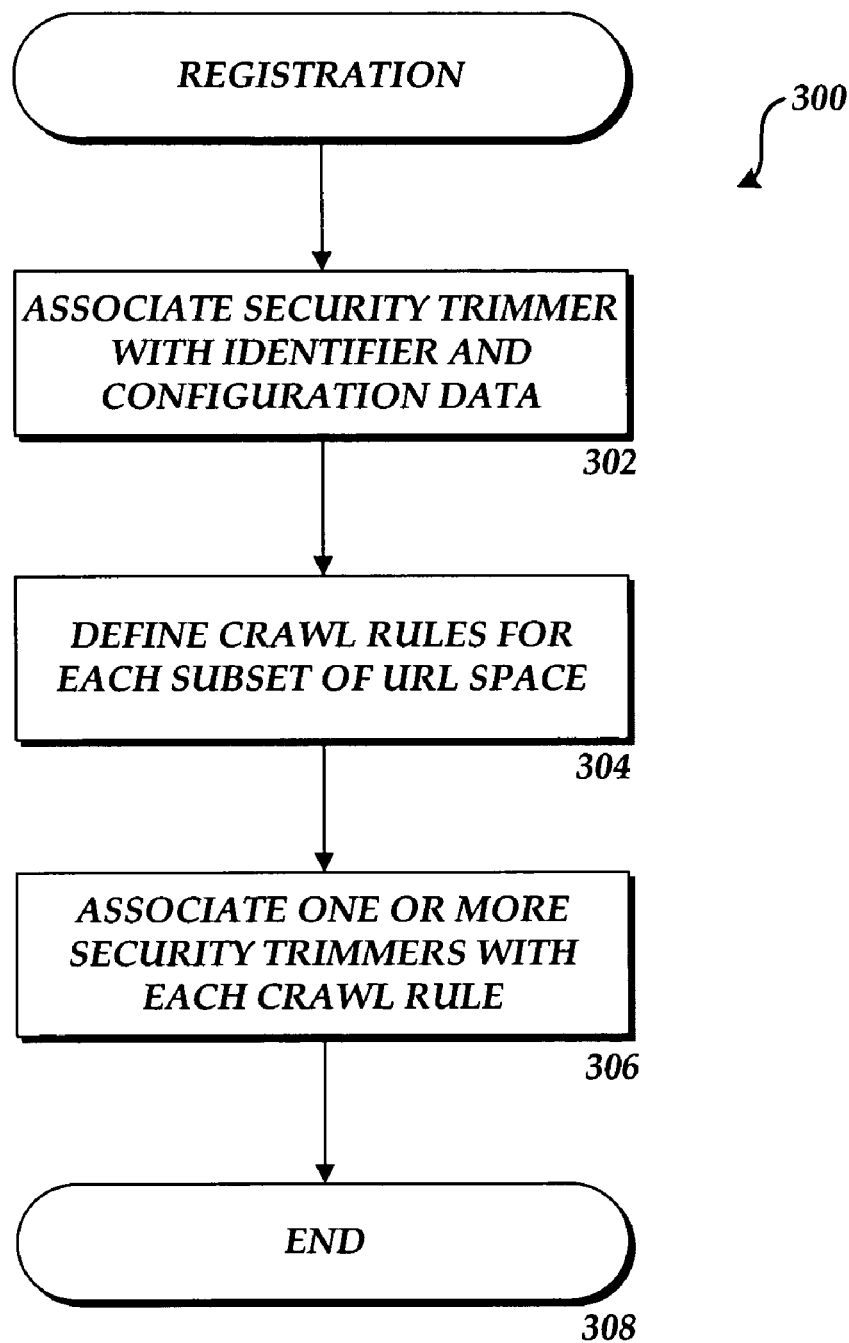
FIGS. 3, 5, and 6A-6B are flow diagrams illustrating various processes provided herein for associating security trimmers with documents according to one implementation described herein.

Referring now to FIG. 3, additional details will be provided regarding the embodiments presented herein for associating documents with security trimmers. In particular, FIG. 3 is a flow diagram showing an illustrative mechanism for associating documents identified in the search index 108 with one or more security trimmers 204. FIG. 3 is described in conjunction with FIG. 4, which shows several data structures utilized to store data for associating documents referenced in the search index 108 with the security trimmers.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

Figure 4:
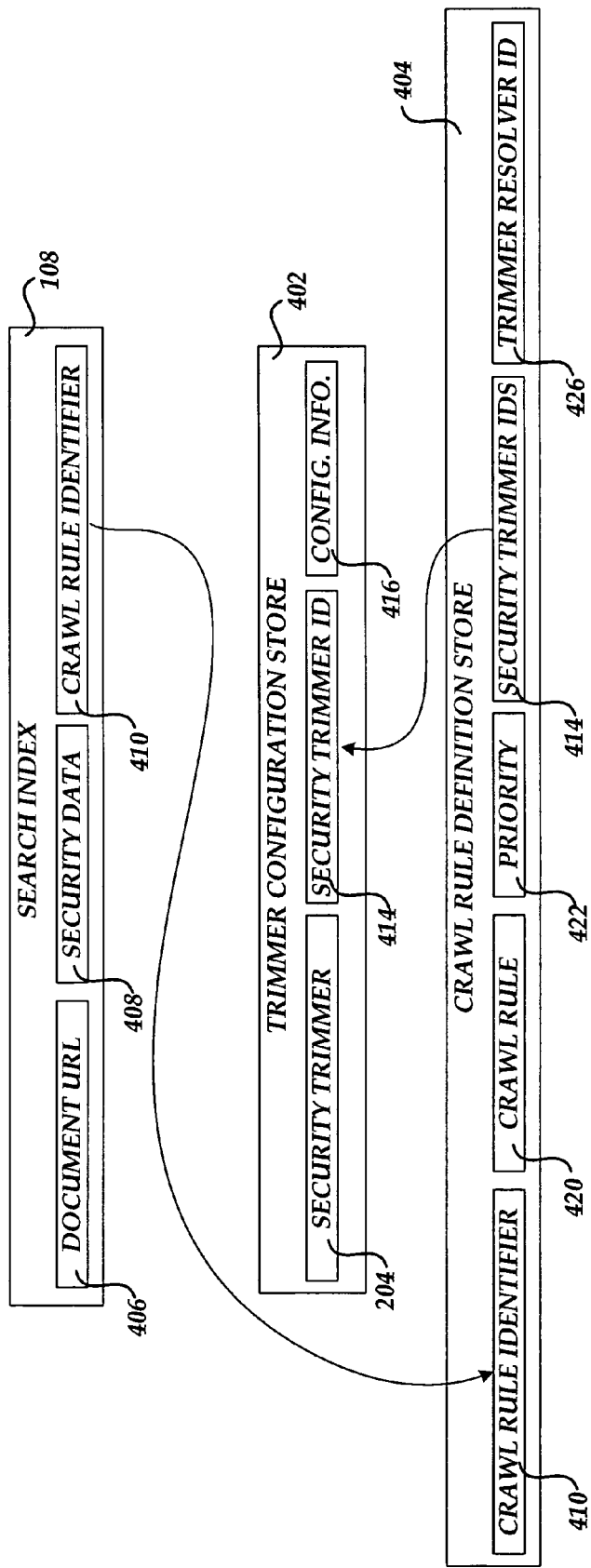
FIG. 4 is a data structure diagram showing the contents of several data structures provided herein for storing associations between documents and security trimmers in one implementation.

The routine 300 begins at operation 302, where a security trimmer implementation is defined by associating a security trimmer 204 with a unique security trimmer identifier 414 and configuration information 416 for the implementation. In one implementation, the security trimmer identifier 414 comprises a unique integer. The configuration information 416 comprises a set of name-value pairs that are utilized at execution time to configure the operation of the referenced instance of a security trimmer 204. In this manner, the same instance of a security trimmer 204 may be registered against multiple security trimmer identifiers 414, each behaving differently based on the configuration information 416 associated with the security trimmer identifier 414. As shown in FIG. 4, a trimmer configuration store 402 may be utilized to store the security trimmer identifiers 414 and the associated configuration information 416.

From operation 302, the routine 300 continues to operation 304, where one or more crawl rules 420 are defined for each subset of the URL space in which documents referenced in the search index 108 are stored. Crawl rules 420 are regular expressions on a document URL. For instance, a crawl rule may be defined such as bdc://*/SAP/CUSTOMER/ID=* to identify all documents on any server that are customers within an SAP system. In this manner, wildcards or regular expressions may be utilized to define a subset of documents in a subset of back-end computing systems. Each crawl rule is also assigned a unique crawl rule identifier 418, such as an integer value.

Once the crawl rules 420 have been defined, the routine 300 continues from operation 304 to operation 306. At operation 306, one or more security trimmer identifiers 424 are associated with each crawl rule 420. A single, optional, trimmer resolver identifier 426 identifying a security trimmer resolver 202 that should be utilized with the crawl rule may also be specified. In one implementation, these data items are stored in a crawl rule definition store 404.

In one embodiment, a crawl rule priority value 422 may also be associated with each crawl rule. The priority value 422 may be utilized to disambiguate the crawl rules. For instance, during a search crawl, the search crawler 106 may discover a document URL 406 that matches the regular expressions specified by multiple crawl rules 420. In this case, only the crawl rule 420 with the highest priority value 422 is utilized, and the crawl rule identifier 410 is stored in the search index 108 associated with the document URL 406 of the identified document.

As shown in FIG. 4, the search index 108 includes a document identifier, such as the document URL 406, for each document referenced therein. The search index 108 may also store the security data 408 retrieved at crawl time for the referenced document. A crawl rule identifier 410 is also associated with the document identifier and stored in the search index 108 at crawl time. The crawl rule identifier 410 associates the document identifier with a crawl rule 420. Each crawl rule 420 is also associated with one or more security trimmer identifiers 424, one optional trimmer resolver identifier 426, and a priority value 422. Each security trimmer identifier 424 corresponds to a particular security trimmer implementation 412 that may be configured uniquely utilizing the configuration information 416. The use of this data to select and execute the appropriate security trimmers for each document in a set of search results will be described below with respect to FIGS. 6A-6B.

Figure 5:
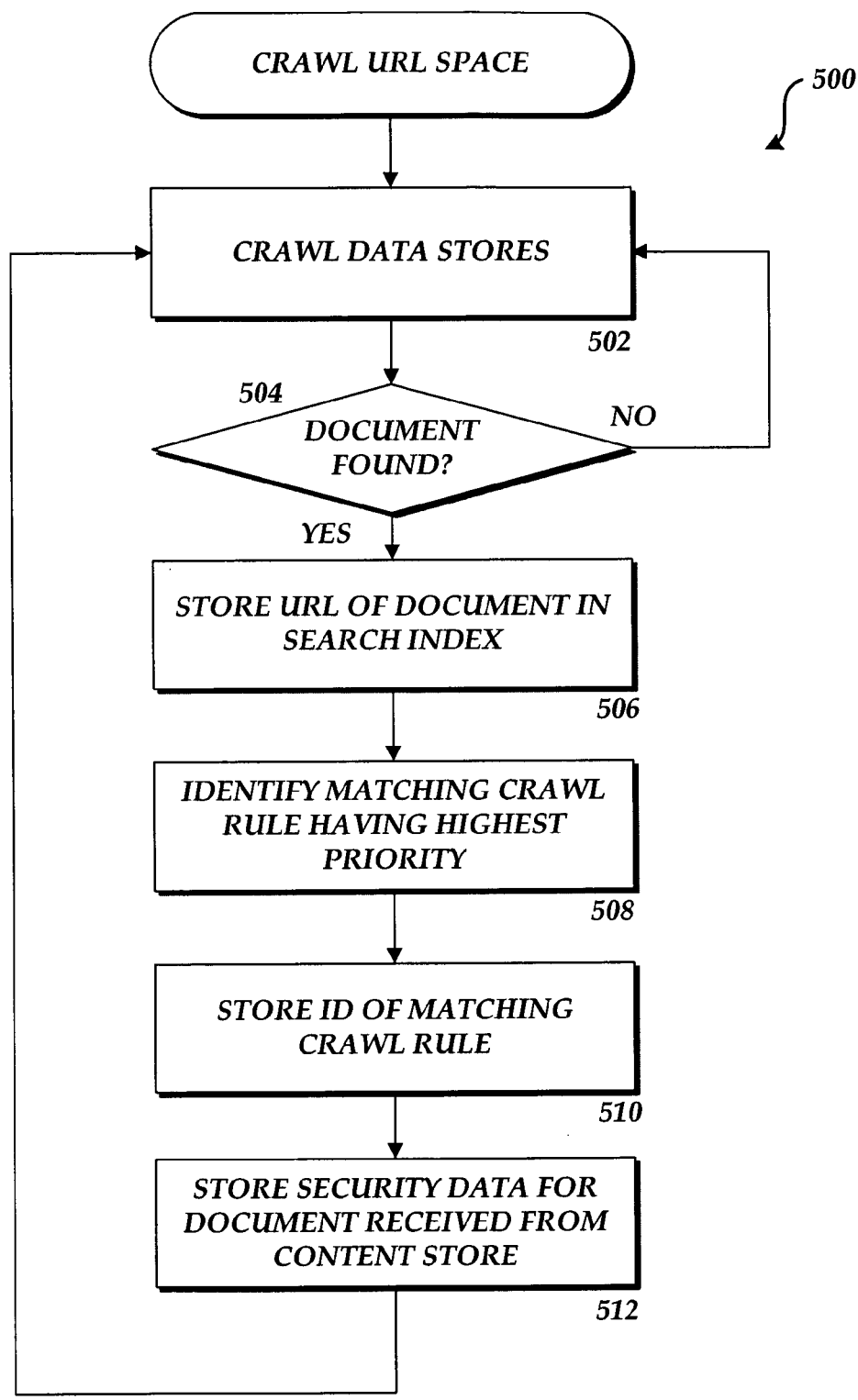

Referring now to FIG. 5 an illustrative routine 500 will be described that illustrates the processing operations performed by the search crawlers 106A-106B for crawling the content stores 114A-114B. The routine 500 begins at operation 502, where a search crawler 106A crawls documents in available content stores in the manner described above. During the crawl process, the routine 500 continues to operation 504, where a determination is made as to whether a document has been found. If not, the routine 500 branches back to operation 502, where the crawling process continues. When a document is found, the routine 500 continues from operation 504 to operation 506.

At operation 506, the search crawler 106A stores the URL 406 of the located document in the search index 108. The routine 500 then continues to operation 508, where the search crawler 106A identifies the crawl rule 420 that matches the location of the discovered document and that also has the highest priority value 422. Once the appropriate crawl rule 420 has been identified, the routine 500 continues to operation 510, where the crawl rule identifier 410 of the matching crawl rule 420 is associated with the document identifier in the search index 108.

From operation 510, the routine 500 then continues to operation 512, where security data 408 associated with the discovered document is also stored in the search index 108. As mentioned above, the security data 408 may optionally be transmitted to the back-end system with the request for access rights to the document. From operation 512, the routine 500 returns to operation 502, where the crawling process continues in the manner described above.

Figure 6A:
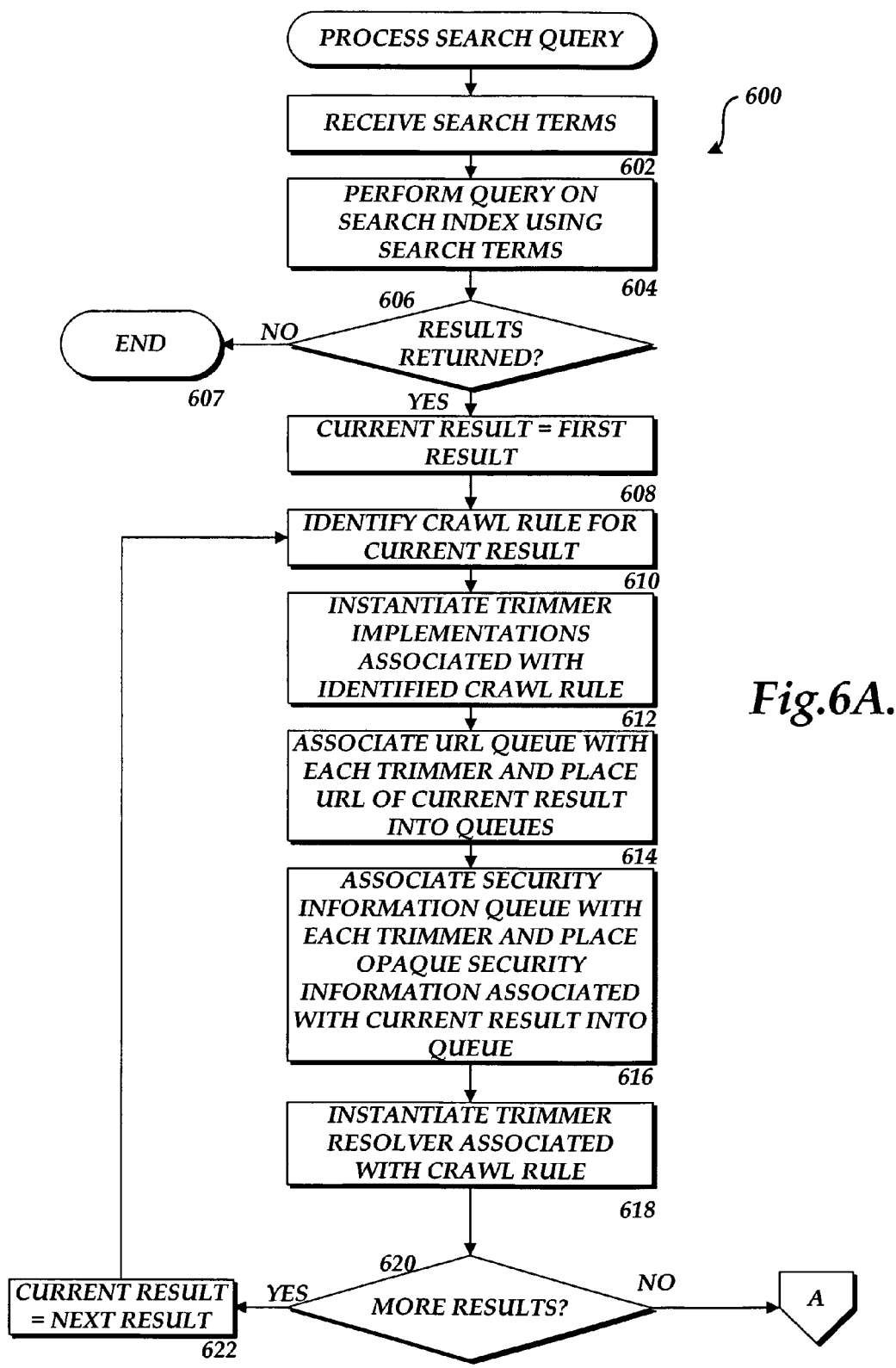
Figure 6B:
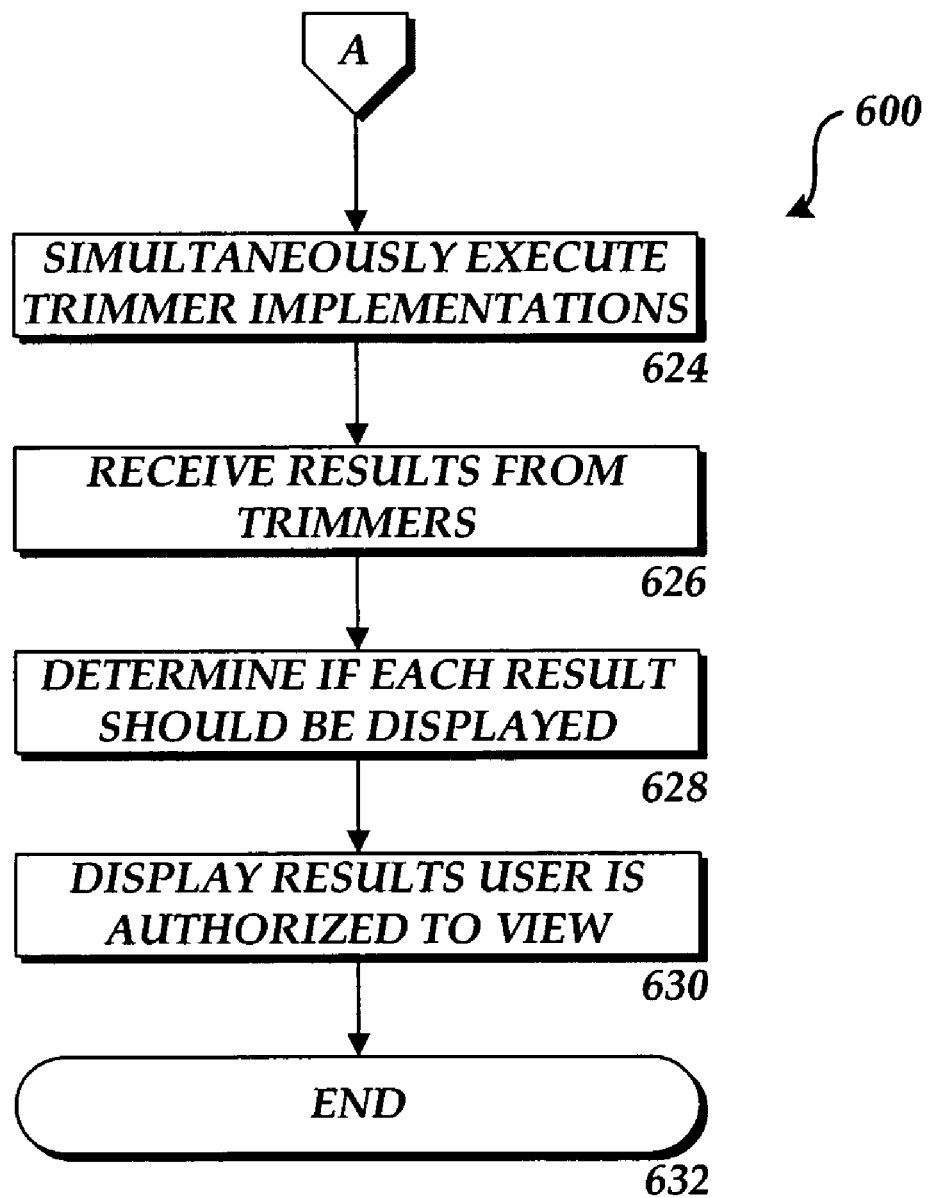

Turning now to FIGS. 6A-6B, an illustrative routine 600 will be described that illustrates the processing operations performed by the query processor 120A for executing a search query on the search index 108. The routine 600 begins at operation 602, where search terms are received from a user, for instance, of the client computer 102. The routine 600 then continues to operation 604, where the query processor 120A queries the search index 108 for documents identified therein that match the provided search terms. The routine 600 then continues to operation 606, where a determination is made as to whether search results were located in the search index 108 matching the search terms. If no matching documents were located, there are no search results to trim, and the routine 600 branches to operation 607, where it ends. If search results were located, the routine 600 continues to operation 608.

At operation 608, a variable identifying a current search result is set to the first returned search result. This variable is utilized to identify the current search result during iteration through all of the returned search results. From operation 608, the routine 600 continues to operation 610, where the crawl rule 420 for the current search result is identified from the data stored in the search index 108 and described above with reference to FIG. 4. The routine 600 then continues to operation 612, where the security trimmers 204 associated with the identified crawl rule 420 are instantiated. If a particular security trimmer 204 has already been instantiated, it is unnecessary to re-instantiate the object.

From operation 612, the routine 600 continues to operation 614, where a URL queue 206 is associated with each security trimmer and the URL of the current search result is placed into the URL queues. The routine 600 then continues to operation 616, where a security data queue 208 is also associated with each security trimmer and any security data 408 associated with the current search result is placed into each security data queue 208. At operation 618, any security trimmer resolver 202 associated with the crawl rule 420 is instantiated.

From operation 618, the routine 600 continues to operation 620, where a determination is made as to whether more search results remain to be processed. If more search results remain to be processed, the routine 600 branches to operation 622, where the value of the current search result variable is set to the next search result. The routine 600 then returns from operation 622 to operation 610, where the next search result is processed in the manner described above. If, at operation 620, the query processor 120 determines that no additional search results remain, the routine 600 continues from operation 620 to operation 622.

At operation 622, all of the instantiated security trimmers 204 are executed simultaneously. The security trimmers 204 process the URLs in their associated URL queues and transmit requests for the access rights for the identified documents to the appropriate back-end systems 112. When the security trimmers 204 receive responses from the back-end systems 112, the results are passed to the security trimmer resolver 202. This occurs at operation 626.

At operation 628, the security trimmer resolver 202 determines based on the information received from each of the security trimmers 204, whether each search result should be displayed to the current user. The results of this determination are then returned to the query processor 120, which utilizes this information at operation 630 to display only those search results that the current user is authorized to view. The routine 600 then continues from operation 630 to operation 632, where it ends.

Figure 7:
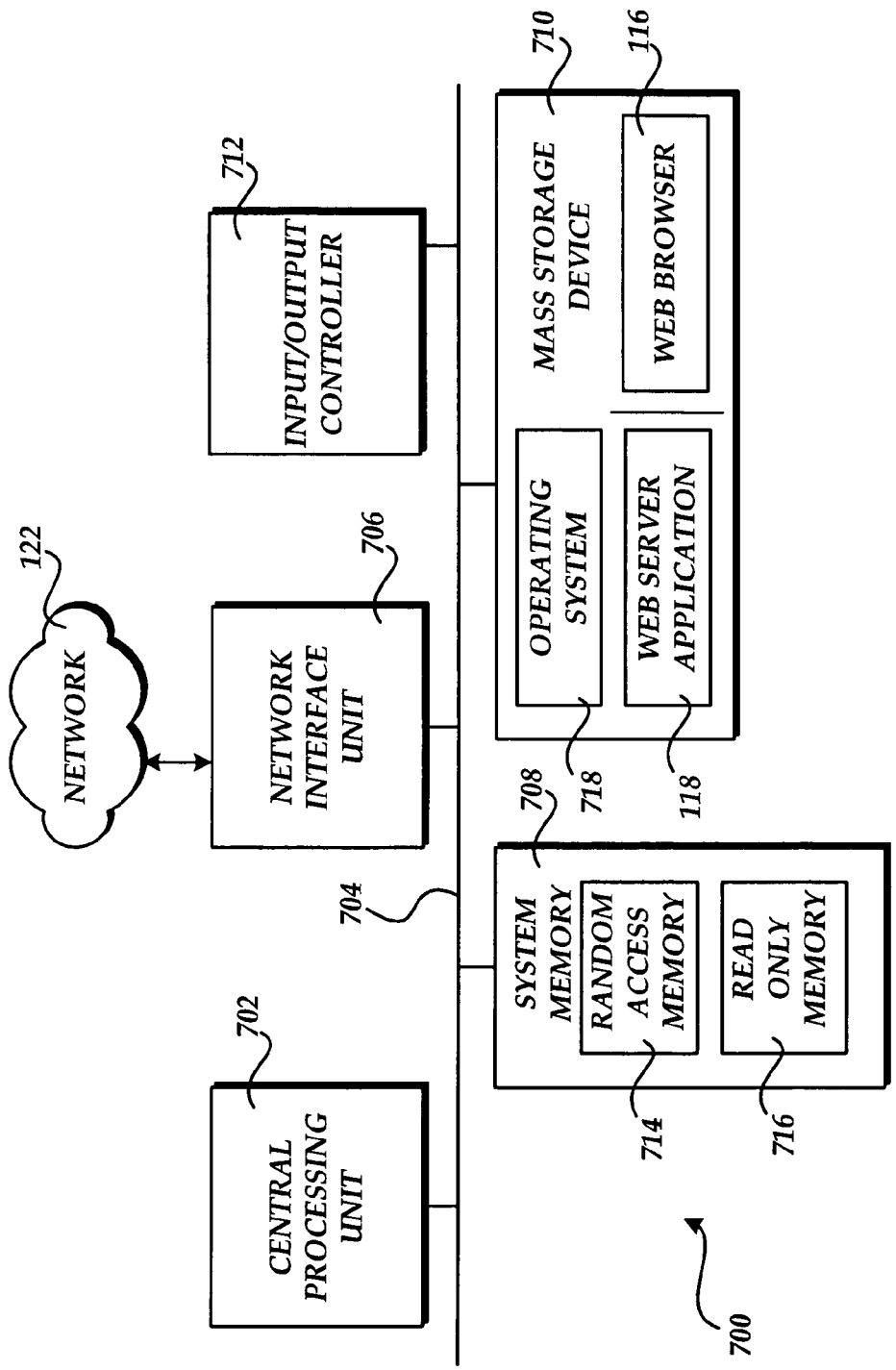
FIG. 7 is a computer architecture diagram showing a computer architecture suitable for implementing the various computer systems described herein.

Referring now to FIG. 7, an illustrative computer architecture for a computer 700 utilized in the various embodiments presented herein will be discussed. The computer architecture shown in FIG. 7 illustrates a conventional desktop, laptop computer, or server computer and may be utilized to embody the client computer 102, the Web server computers 104A-104B, or the back-end systems 112A-112B.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network 122, such as the Internet. The computer 700 may connect to the network 122 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that although the embodiments presented herein are described in the context of a desktop or laptop client computer 102 and a remote Web server computer 104, many other types of computing devices and systems may be utilized to embody the various aspects presented herein.

The mass storage device 710 and RAM 714 may also store one or more program modules. In particular, the mass storage device 710 and the RAM 714 may store a Web browser 116, a Web server application 118, and the other program modules described above with respect to FIGS. 1 and 2. Other program modules may also be stored in the mass storage device 710 and utilized by the computer 700.

Based on the foregoing, it should be appreciated that systems, methods, and computer-readable media for associating documents with security trimmers are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for associating security trimmers with documents, the computer-implemented method comprising performing computer-implemented operations for:

maintaining a search index at a Web server computer, the search index comprising one or more document identifiers, wherein each document identifier comprises a URL referencing a document and having an associated crawl rule identifier;

maintaining a security trimmer configuration store comprising one or more security trimmer implementations comprising one or more security trimmer identifiers, each security trimmer identifier referencing a security trimmer and having associated configuration information for configuring the security trimmer, each security trimmer configured to invoke an application programming interface (API) exposed by a back-end computing system for determining whether a user has access rights to a document;

maintaining a crawl rule definition store comprising one or more crawl rules, each crawl rule comprising a regular expression on a document identifier and being associated with one or more security trimmer identifiers, and each crawl rule being further associated with a priority value;

selecting the crawl rule for use with the document identifier based upon the priority value;

receiving a query request from the user at the Web server computer, the query request including one or more search terms;

in response to receiving the query request at the Web server computer, querying the search index to identify an identified document that matches the search terms;

identifying the security trimmer implementations for the identified document using the associated crawl rule identifier and crawl rule definition store;

executing the security trimmer corresponding to the identified security trimmer implementations to retrieve access rights for the identified document, the access rights being retrieved from the API exposed by the back-end computing system;

associating each crawl rule with a trimmer resolver, the trimmer resolver being configured to receive the access rights from each of the security trimmers and to determine, based upon the received access rights, whether the user is permitted to view the identified document;

executing the trimmer resolver to determine whether the user is permitted to view the identified document; and if the user is permitted to view the identified document, causing the identified document to be displayed to the user.

2. The method of claim 1, wherein each document identifier in the search index is associated with security data obtained from a back-end data store storing the document associated with the document identifier.

3. The method of claim 2, wherein the security trimmer of each security trimmer implementation is associated with a security data queue configured for storing security data associated with each document identifier.

4. The method of claim 3, wherein the security trimmer of each security trimmer implementation is associated with a uniform resource locator queue configured for storing one or more document identifiers.

5. A computer-readable storage medium having computer-executable instructions stored thereon that, when executed by a computer, cause the computer to:

maintain a search index at a Web server computer, the search index comprising one or more document identifiers, wherein each document identifier comprises a URL referencing a document and having an associated crawl rule identifier;

maintain a security trimmer configuration store comprising one or more security trimmer implementations comprising one or more security trimmer identifiers, each security trimmer identifier referencing a security trimmer and having associated configuration information for configuring the security trimmer, each security trimmer configured to invoke an application programming interface (API) exposed by a back-end computing system for determining whether a user has access rights to a document;

maintain a crawl rule definition store comprising one or more crawl rules, each crawl rule comprising a regular expression on a document identifier and being associated with one or more security trimmer identifiers, and each crawl rule being further associated with a priority value;

select the crawl rule for use with the document identifier based upon the priority value;

receive a query request from the user at the Web server computer, the query request including one or more search terms;

in response to receive the query request at the Web server computer, query the search index to identify an identified document that matches the search terms;

identify the security trimmer implementations for the identified document using the associated crawl rule identifier and crawl rule definition store;

execute the security trimmer corresponding to the identified security trimmer implementations to retrieve access rights for the identified document, the access rights being retrieved from the API exposed by the back-end computing system;

associate each crawl rule with a trimmer resolver, the trimmer resolver being configured to receive the access rights from each of the security trimmers and to determine, based upon the received access rights, whether the user is permitted to view the identified document;

execute the trimmer resolver to determine whether the user is permitted to view the identified document; and if the user is permitted to view the identified document, cause the identified document to be displayed to the user.

6. The computer-readable storage medium of claim 5, wherein each document identifier in the search index is associated with security data obtained from a back-end data store storing the document associated with the document identifier.

7. The computer-readable storage medium of claim 6, wherein the security trimmer of each security trimmer implementation is associated with a security data queue configured for storing security data associated with each document identifier.

8. The computer-readable storage medium of claim 7, wherein the security trimmer of each security trimmer implementation is associated with a uniform resource locator queue configured for storing one or more document identifiers.

* * * * *